(12) United States Patent
Kojima et al.

(10) Patent No.: US 12,742,290 B2
(45) Date of Patent: Sep. 22, 2026

(54) LAMINATE AND ROLL

(71) Applicant: TOPPAN Holdings Inc., Tokyo (JP)

(72) Inventors: Yumiko Kojima, Tokyo (JP); Junichi Kaminaga, Tokyo (JP); Yoshiki Koshiyama, Tokyo (JP); Rika Ishii, Tokyo (JP); Hiroyuki Wakabayashi, Tokyo (JP)

(73) Assignee: TOPPAN Holdings Inc., Tokyo (JP)

( * ) Notice: Subject to any disclaimer, the term of this patent is extended or adjusted under 35 U.S.C. 154(b) by 168 days.

(21) Appl. No.: 18/553,007

(22) PCT Filed: Mar. 29, 2022

(86) PCT No.: PCT/JP2022/015575

§ 371 (c)(1),
(2) Date: Sep. 28, 2023

(87) PCT Pub. No.: WO2022/215602

PCT Pub. Date: Oct. 13, 2022

(65) Prior Publication Data

US 2024/0150966 A1 May 9, 2024

(30) Foreign Application Priority Data

Apr. 5, 2021 (JP) ................................. 2021-064119

(51) Int. Cl.

| | |
|---|---|
| ***D21H 19/82*** | (2006.01) |
| ***D21H 19/22*** | (2006.01) |
| ***D21H 19/40*** | (2006.01) |
| ***G01N 19/04*** | (2006.01) |

(52) U.S. Cl.
CPC ............. *D21H 19/22* (2013.01); *D21H 19/40* (2013.01); *D21H 19/824* (2013.01); *G01N 19/04* (2013.01)

(58) Field of Classification Search
CPC ................................................ D21H 19/00–84
See application file for complete search history.

(56) References Cited

U.S. PATENT DOCUMENTS

2005/0039871 A1* 2/2005 Urscheler .............. D21H 23/48 162/137
2018/0282449 A1* 10/2018 Carvagno .............. C08F 10/06

FOREIGN PATENT DOCUMENTS

| | | |
|---|---|---|
| JP | 57-024247 | 2/1982 |
| JP | 8-226096 | 9/1996 |
| JP | 2012-201839 | 10/2012 |
| WO | WO 2020/152753 A1 | 7/2020 |
| WO | WO 2021/010040 A1 | 1/2021 |

OTHER PUBLICATIONS 2012-201839 English machine translation (Year: 2012).*
JP 8-226096 English machine translation (Year: 1996).*
WO2021/010040 English machine translation (Year: 2021).*

(Continued)

*Primary Examiner* — Blaine Copenheaver
(74) *Attorney, Agent, or Firm* — Studebaker Brackett PLLC

(57) ABSTRACT

A laminate including: a paper substrate; a coating layer containing a polyolefin resin; and a plurality of particles fixed to the coating layer, in which a particle diameter of the particles is greater than a thickness of the coating layer.

8 Claims, 5 Drawing Sheets

(56) References Cited

OTHER PUBLICATIONS

English Translation of IPRP (PCT/IB/338 and PCT/IB/373) (Oct. 19, 2023 and Oct. 10, 2023) and the Written Opinion of ISA (PCT/ISA/237) issued in counterpart International Application No. PCT/JP2022/015575 dated Jun. 14, 2022 (6 pages).
International Search Report issued in International Application No. PCT/JP2022/015575 dated Jun. 14, 2022.
Extended European Search Report issued in counterpart European Application No. 22784586.4 dated Jul. 9, 2024.

* cited by examiner (a)

(b)

(a)

(b)

LAMINATE AND ROLL

CROSS REFERENCE TO RELATED APPLICATIONS

This application is a 35 USC 371 U.S. national stage application of International Application No. PCT/JP2022/015575, filed on Mar. 29, 2022, which claims the priority benefit to Japanese Application No. 2021-064119, filed on Apr. 5, 2021. The International Application is incorporated by reference herein in its entirety.

TECHNICAL FIELD

The present disclosure relates to a laminate and a roll including a paper substrate and a coating layer containing a polyolefin resin.

BACKGROUND ART

Recently, a plastic free momentum has increased in accordance with an increase in the environmental awareness starting with the problem of marine plastic waste, and in various fields, the use of paper instead of a plastic material has been considered. The field of a packaging material is one of the various fields, and in Patent Literature 1, packaging paper including at least one heat-seal layer on at least one surface of a paper substrate is described.

CITATION LIST

Patent Literature

Patent Literature 1: International Publication WO 2020/152753

SUMMARY OF INVENTION

Technical Problem

According to the studies of the present inventors, when a product in which the packaging paper is wound into the shape of a roll is pulled out in the next step, a phenomenon that the paper fiber of the paper substrate is taken away by a heat-seal layer, that is, a phenomenon that the paper fiber of the paper substrate is peeled off and attached to the surface of the heat-seal layer (hereinafter, referred to as "fiber peeling") easily occurs. Such a phenomenon causes an appearance defect of the packaging paper and a decrease in a heat-seal strength. A part of the substrate being peeled off and attached to a coating layer is a problem that did not occur in the case of using a plastic substrate of the related art, and can be a new problem that has occurred by using paper as the substrate.

The fiber peeling particularly easily occurs after the roll-shaped product is exposed to a temperature of 40° C. or higher. According to the studies of the present inventors, in a case where the heat-seal layer is formed by coating in order to further reduce a plastic ratio in the packaging material, and the heat-seal layer is exposed at a temperature of 40° C. or higher in the state of being in contact with the paper substrate, adhesiveness to the paper substrate increases, and the fiber peeling easily occurs. Note that, in a case where the roll-shaped product is contained in a container and exported by ship, the inside of the container may be approximately 60° C., in accordance with the course of the ship.

The present disclosure provides a laminate and a roll with less fiber peeling of a paper substrate even after being exposed at a temperature of 40° C. or higher.

Solution to Problem

A laminate according to one aspect of the present disclosure, includes: a paper substrate; a coating layer containing a polyolefin resin; and a plurality of particles fixed to the coating layer, in which a particle diameter of the particles is greater than a thickness of the coating layer. According to the laminate described above, since the material of the substrate is paper, it is possible to reduce the used amount of a plastic material. In addition, according to the laminate described above, since a contact area between the paper substrate and the coating layer is decreased by the protruded particles, even in a case where the laminate is stacked or wound into the shape of a roll, it is possible to suppress an increase in the adhesiveness of the coating layer to the paper substrate. Accordingly, even after the laminate is exposed to a temperature of 40° C. or higher, it is possible to suppress fiber peeling, and as a result thereof, it is possible to suppress an appearance defect and a decrease in a heat-seal strength. The laminate according to the present disclosure is useful for a packaging bag such as a pillow bag and a standing pouch.

In the laminate described above, it is preferable that a peeling strength measured through steps described below is 0.1 N/15 mm or less.

<Measurement of Peeling Strength>

(a1) accommodating a sample from stacking five sheets of the laminates facing a same direction in a constant-temperature bath set at 40° C. for 3 days, in a state in which a load of 100 kgf is applied to the sample.

(b1) peeling off two sheets of laminates together from the sample after the step (a1).

(c1) implementing a T-type peeling test on the two sheets of laminates at a peeling rate of 300 mm/minute.

In the laminate in which the peeling strength measured in the step (c1) is in the range described above, the fiber peeling is less likely to occur even in a case where the laminate is subjected to thermal history at 40° C., and as a result thereof, it is possible to more highly suppress the appearance defect and the decrease in the heat-seal strength.

In the laminate described above, it is preferable that a heat-seal strength measured through steps described below is 2.1 N/15 mm or more.

<Measurement of Heat-Seal Strength>

(a2) accommodating a sample from stacking five sheets of the laminates facing a same direction in a constant-temperature bath set at 40° C. for 3 days in a state in which a load of 100 kgf is applied to the sample.

(b2) peeling off two sheets of laminates separately from the sample after the step (a2).

(c2) heat-sealing the coating layers of the two sheets of laminates in a condition of a pressure of 0.2 MPa, a temperature of 120° C., and a time for 1 second.

(d2) implementing a T-type peeling test on a sample obtained in the step (c2) at a peeling rate of 300 mm/minute.

In the laminate in which the heat-seal strength measured through the steps described above is in the range described above, the fiber peeling is sufficiently suppressed even in a case where the laminate is subjected to the thermal history at 40° C., and a sufficient heat-seal strength is obtained.

The material of the particles, for example, is one selected from the group consisting of polyolefin and a partially modified product thereof, and paraffin. The material described above is compatible with the coating layer containing the polyolefin resin, thereby being less likely to decrease the gas barrier properties or the like of the coating layer. The laminate described above may further include a vapor-deposited layer between the paper substrate and the coating layer.

It is preferable that a ratio A/B of a mass A of the coating layer to a mass B of the particles is 100/20 to 100/0.2. By setting the ratio to 100/20 or more, there is a tendency that it is possible for the coating layer to exhibit a sufficient heat-seal strength, whereas by setting the ratio to 100/0.2 or less, there is a tendency that it is possible to sufficiently suppress the occurrence of the fiber peeling.

A roll according to one aspect of the present disclosure is obtained by winding the laminate described above. According to the roll, it is possible to suppress the fiber peeling even after the roll is exposed at a temperature of 40° C. or higher, and as a result thereof, it is possible to suppress the appearance defect and the decrease in the heat-seal strength.

Advantageous Effects of Invention

According to the present disclosure, the laminate and the roll with less fiber peeling of the paper substrate even after being exposed to a temperature of 40° C. or higher are provided.

DESCRIPTION OF EMBODIMENTS

Embodiments of the present disclosure will be described with reference to the drawings, as necessary. Here, the present invention is not limited to the following embodiments.

[Laminate]

Figure 1:
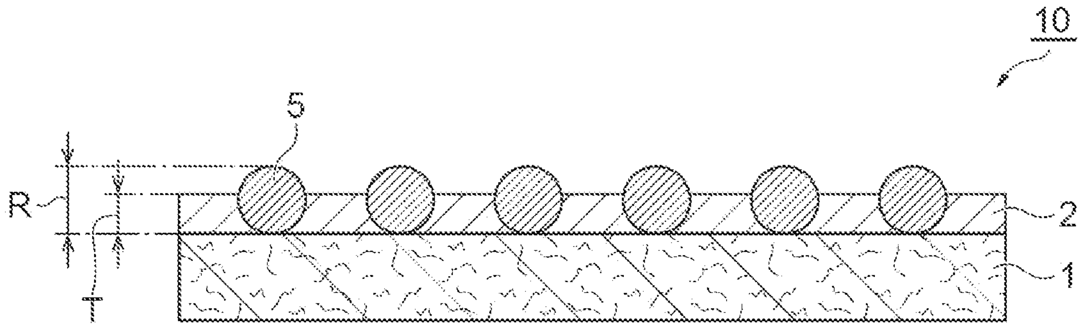
FIG. 1 is a sectional view schematically illustrating one embodiment of a laminate according to the present disclosure.

FIG. 1 is a sectional view schematically illustrating a laminate according to this embodiment. A laminate 10 illustrated in the drawing includes a paper substrate 1, a coating layer 2 containing a polyolefin resin, and a plurality of particles 5 fixed to the coating layer 2. The particle diameter of the particles 5 is greater than the thickness of the coating layer 2. The coating layer 2, for example, is formed by applying a coating liquid containing the polyolefin resin, the particles 5, and a solvent, and then, removing the solvent by heating. In the laminate 10, one surface is configured as the paper substrate 1, the other surface is configured as the coating layer 2 and the plurality of particles 5 fixed thereto.

According to the laminate 10, since the material of the substrate is paper, it is possible to reduce the used amount of a plastic material, compared to a laminate in which the material of a substrate is plastic. In addition, according to the laminate 10, as illustrated in FIG. 1, since the particles 5 protrude to the surface of the coating layer 2, it is possible to decrease the contact area of the coating layer 2 with the paper substrate 1. Accordingly, even in a state where the paper substrate 1 and the coating layer 2 face each other by stacking the laminate 10 or winding the laminate 10 into the shape of a roll, it is possible to suppress an increase in the adhesiveness of the coating layer 2 to the paper substrate 1, and to highly suppress fiber peeling. Hereinafter, each constituent of the laminate 10 will be described.

(Paper Substrate)

Specific examples of paper that can be used as the paper substrate 1 include woodfree paper, special woodfree paper, coated paper, art paper, cast-coated paper, construction paper, craft paper, and glassine paper. The basis weight (mass per unit area) of the paper substrate 1, for example, is 10 to 1000 g/m$^2$. The basis weight of packaging paper, which has high barrier properties, water-repellent properties, and oil-repellent properties and can also be used in flexible packaging, for example, is 20 to 500 g/m$^2$, and may be 25 to 120 g/m$^2$ or 30 to 95 g/m$^2$. In order to prevent the coating layer 2 containing the polyolefin resin from permeating the paper substrate 1, a clay coated layer may be provided on the paper substrate 1. In a laminate 20 illustrated in FIG. 2, a clay coated layer 3 is interposed between the paper substrate 1 and the coating layer 2.

(Coating Layer)

The coating layer 2, for example, is a layer imparting sealing properties by heat seal in the laminate 10, and contains the polyolefin resin. Examples of the polyolefin resin include a copolymer such as ethylene, propylene, an acrylic acid, a methacrylic acid, a maleic acid anhydride, vinyl acetate, styrene, a urethane-based compound, and a fluorine-based compound, or a modified product thereof. From the viewpoint of improving the adhesiveness to the paper substrate 1, it is preferable to use a polyolefin resin having a functional group with polarity, and from the viewpoint of water resistance, oil resistance, heat-sealing properties, and metal adhesion, it is preferable to use an ionomer.

In this embodiment, the ionomer is a general term of a synthetic resin in which high molecules are formed into an aggregate by using an aggregation force of metal ions, and is a resin obtained by combining an acrylic acid or a methacrylic acid with ethylene or the like. That is, a metal salt of an ethylene•methacrylic acid copolymer, a metal salt of an ethylene•acrylic copolymer, a metal salt of an ethylene•urethane-based copolymer, a metal salt of an ethylene•fluorine-based high-molecular copolymer, and the like are all referred to as the ionomer. Examples of the metal forming the salt include alkali metal ions and alkali earth metal ions, specifically, ions of each of sodium, potassium, calcium, magnesium, and zinc, and the like. It is preferable that the ionomer is a self-emulsifying emulsion, which is the metal salt of the ethylene•acrylic acid copolymer and the ethylene•methacrylic acid copolymer.

A thickness T of the coating layer 2 (a thickness T illustrated in FIG. 1) is preferably 0.1 to 10 μm, and more preferably 1 to 5 μm. The thickness T of the coating layer 2 can be measured by observing the sectional surface of the laminate 10 with an optical microscope or SEM. By setting the thickness of the coating layer 2 to 0.1 μm or more, there is a tendency that it is possible for the coating layer 2 to exhibit a sufficient heat-seal strength, compared to a case where the thickness is less than 0.1 μm, whereas by setting the thickness to 10 μm or less, there is a tendency that it is possible to decrease the used amount of the plastic material (the polyolefin resin), compared to a case where the thickness is greater than 10 μm.

(Particles)

The plurality of particles 5 are fixed to the coating layer 2, and have a feature that the particle diameter is greater than the thickness of the coating layer 2. The particle diameter of the particles 5 can be measured by a Coulter counter method. A particle diameter R of the particles 5 (a particle diameter R illustrated in FIG. 1) is preferably 0.2 to 12 μm, and more preferably 1.2 to 6.5 μm, on the premise that the particle diameter R is greater than the thickness T of the coating layer 2 after drying. Since the thickness of the coating layer 2 can also be increased to a certain extent by setting the particle diameter R to 0.2 μm or more, there is a tendency that it is possible to sufficiently ensure the heat-sealing properties of the coating layer 2. On the other hand, by setting the particle diameter R to 12 μm or less, for example, there is a tendency that it is possible to suppress a problem that a plate used in coating is clogged with the particles 5.

A ratio R/T of the particle diameter R of the particles 5 to the thickness T of the coating layer 2, for example, is 1.05 to 2.0, and may be 1.1 to 1.5 or 1.1 to 1.3. By setting the value to 1.05 or more, there is a tendency that it is possible to suppress the fiber peeling, whereas by setting the value to 2.0 or less, there is a tendency that it is possible to prevent the particles 5 from falling off from the coating layer 2. Note that, in a case where the coating layer 2 contains particles smaller than the thickness T, the particles do not correspond to the particles 5.

The material of the particles 5 is one selected from the group consisting of polyolefin and a partially modified product thereof, and paraffin. In order to reduce the adhesiveness to the paper substrate 1, it is preferable that the particles 5 have few functional groups with polarity on the surface. As the polyolefin, the same as that usable in the coating layer 2 may be used. It is preferable that the material of the particles 5 is high-density polyethylene, from the viewpoint of improving the barrier properties of the laminate 10. The particles 5 may contain the constituent unit of the same monomer as that of the coating layer 2, or may contain the constituent unit of a monomer different from that of the coating layer 2.

As the material of the particles 5, synthetic wax such as polyolefin wax (polyethylene-based or polypropylene-based wax), and natural wax such as paraffin wax may be used. Since the polyolefin wax has a molecular weight less than that of the polyolefin used in the coating layer 2 and low viscosity, it is possible to further suppress the fiber peeling.

A ratio A/B of a mass A of the coating layer 2 to a mass B of the particles 5 is preferably 100/20 to 100/0.2, and more preferably 100/20 to 100/0.3. By setting the ratio described above to 100/20 or more, there is a tendency that it is possible for the coating layer 2 to exhibit a sufficient heat-seal strength, whereas by setting the ratio to 100/0.2 or less, there is a tendency that it is possible to sufficiently suppress the occurrence of the fiber peeling.

[Method for Producing Laminate]

The coating layer 2 can be provided by applying the coating liquid containing the polyolefin resin, the particles 5, and the solvent to one surface of the paper substrate 1, and drying the coating liquid. Specific examples of a coating device used in the formation of the coating layer 2 include an air knife coater, a blade coater, a gravure coater, a rod blade coater, a roll coater, a reverse roll coater, a bar coater, a curtain coater, a die slot coater, a champrex coater, a metering blade type size press coater, a Short Dwell coater, a spray coater, a gate roll coater, and a lip coater.

[Properties of Laminate]

The laminate 10 has properties that it is possible to suppress the fiber peeling even in a case where the laminate is exposed at a temperature of 40° C. or higher in the state of being stacked or wound into the shape of a roll, and as a result thereof, it is possible to suppress an appearance defect and a decrease in the heat-seal strength. Such properties can be checked by implementing the following peeling strength test or heat-seal strength test.

(Peeling Strength Test)

In the laminate 10, a peeling strength measured through the following steps is preferably 0.1 N/15 mm or less, and may be 0.08 N/15 mm or less or 0.05 N/15 mm or less. The lower limit value of the value, for example, is 0.01 N/15 mm.

<Measurement of Peeling Strength>

(a1) accommodating a sample from stacking five sheets of the laminates facing a same direction in a constant-temperature bath set at 40° C. for 3 days, in a state in which a load of 100 kgf is applied to the sample.

(b1) peeling off two sheets of laminates together from the sample after the step (a1).

(c1) implementing a T-type peeling test on the two sheets of laminates at a peeling rate of 300 mm/minute.

Figure 3:
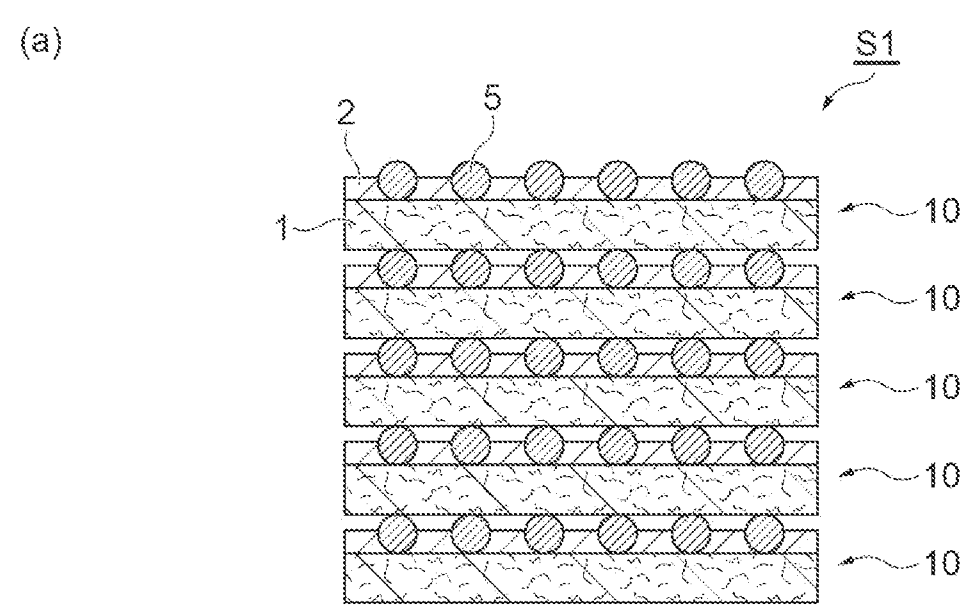
FIG. 3(*a*) is a sectional view schematically illustrating a sample contained in a constant-temperature bath in a peeling strength test and a heat-seal strength test of the present disclosure, and FIG. 3(*b*) is a sectional view schematically illustrating a state in which the peeling strength test is implemented.
Figure 3:
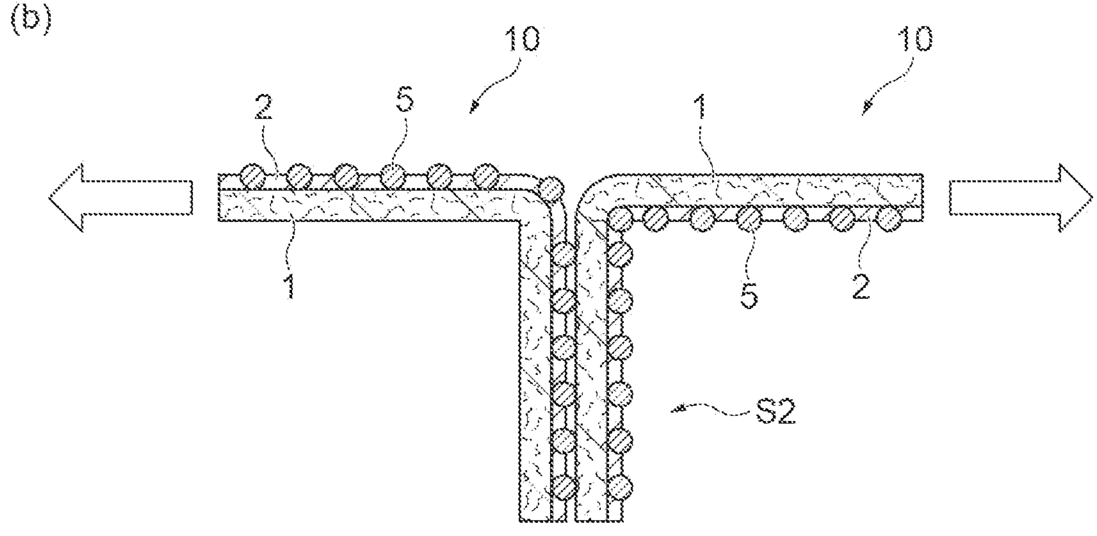

FIG. 3(*a*) is a sectional view schematically illustrating the sample S1. FIG. 3(*b*) is a sectional view schematically illustrating a state where the step (c1) is implemented. As illustrated in FIG. 3(*b*), in the step (c1), peeling occurs on the interface between the paper substrate 1 of one laminate 10 of a laminate S2 and the coating layer 2 of the other laminate 10. The peeling strength of 0.1 N/15 mm or less indicates that the adhesive force of the coating layer 2 to the paper substrate 1 is sufficiently low even in a case where the laminate is subjected to the step (a1). In a case where the peeling strength is 0.1 N/15 mm or less, it is possible to sufficiently suppress the occurrence of the fiber peeling.

In the step (a1), the setting temperature of the constant-temperature bath may be 60° C., instead of 40° C. In this case, it is preferable that the peeling strength measured in the step (c1) is maintained to 0.1 N/15 mm or less, and the peeling strength may be 0.08 N/15 mm or less or 0.03 N/15 mm or less. The lower limit value of the value, for example, is 0.01 N/15 mm. The peeling strength of 0.1 N/15 mm or less indicates that the adhesive force of the coating layer 2 to the paper substrate 1 is sufficiently low even in a case where the laminate is subjected to thermal history at 60° C. for 3 days.

(Heat-Seal Strength Test)

In the laminate 10, the heat-seal strength measured through the following steps is preferably 2.1 N/15 mm or more, and may be 2.5 N/15 mm or more or 2.9 N/15 mm or more. The upper limit value of the value, for example, is 7.0 N/15 mm.

<Measurement of Heat-Seal Strength>

(a2) accommodating a sample from stacking five sheets of the laminates facing a same direction in a constant-temperature bath set at 40° C. for 3 days in a state in which a load of 100 kgf is applied to the sample.

(b2) peeling off two sheets of laminates separately from the sample after the step (a2).

(c2) heat-sealing the coating layers of the two sheets of laminates in a condition of a pressure of 0.2 MPa, a temperature of 120° C., and a time for 1 second.

(d2) implementing a T-type peeling test on a sample obtained in the step (c2) at a peeling rate of 300 mm/minute.

Figure 4:
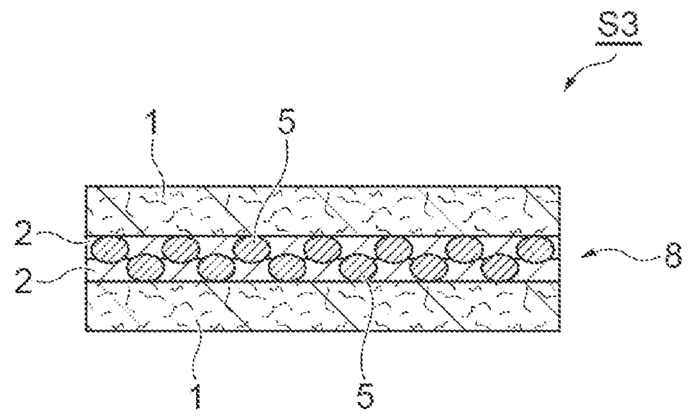
FIG. 4(*a*) is a sectional view schematically illustrating the sample used in the measurement of a heat-seal strength of the present disclosure, and FIG. 4(*b*) is a sectional view schematically illustrating a state in which the heat-seal strength test is implemented.
Figure 4:
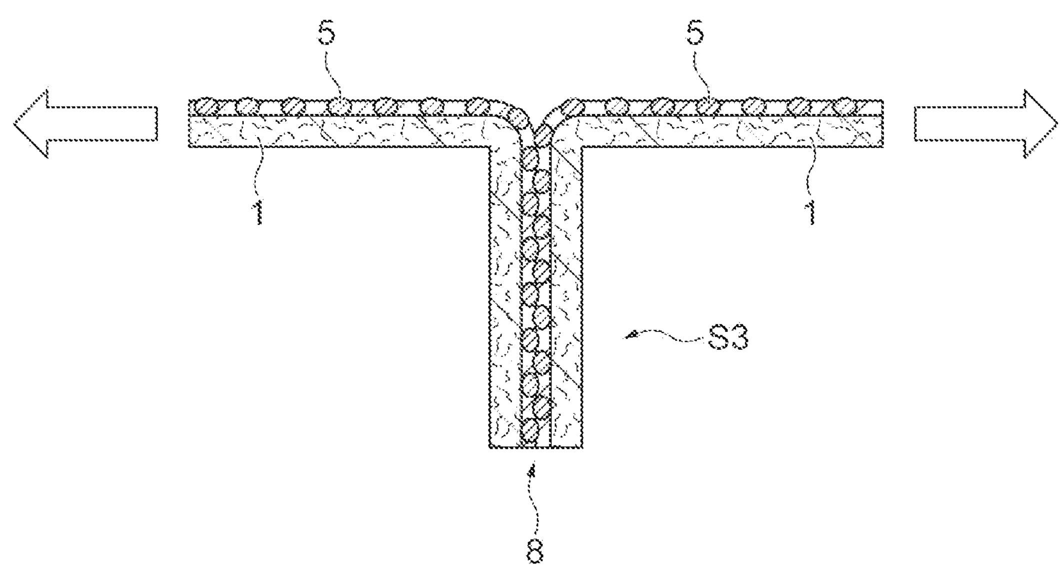

FIG. 4(*a*) is a sectional view schematically illustrating the sample S3. The sample S3 includes a heat-seal portion 8 in which the coating layer 2 of one laminate 10 and the coating layer 2 of the other laminate are fused by heat. FIG. 4(*b*) is a sectional view schematically illustrating a state where the step (d2) is implemented. As illustrated in FIG. 4(*b*), in the step (d2), peeling occurs in the heat-seal portion 8 of the sample S3. The heat-seal strength of 2.1 N/15 mm or more indicates that the attachment of the paper fiber to the surface of the coating layer 2 due to the fiber peeling is sufficiently small even in a case where the laminate is subjected to the step (a2) and the step (b2).

In the step (a2), the setting temperature of the constant-temperature bath may be 60° C., instead of 40° C. In this case, the heat-seal strength to be measured is preferably 1.5 N/15 mm or more, and may be 1.8 N/15 mm or more or 2.4 N/15 mm or more. The upper limit value of the value, for example, is 5.0 N/15 mm. The heat-seal strength of 1.5 N/15 mm or more indicates that it is possible to sufficiently suppress the occurrence of the fiber peeling even in a case where the laminate is subjected to the thermal history at 60° C. for 3 days and ensure a sufficient heat-seal strength.

[Roll]

The laminate 10 may be wound to produce a roll. In the production of the roll, the laminate may be wound such that the paper substrate 1 is on the outside, or the laminate may be wound such that the coating layer 2 is on the outside. The particles 5 contained in the laminate 10 may be deformed by the winding pressure.

Figure 5:
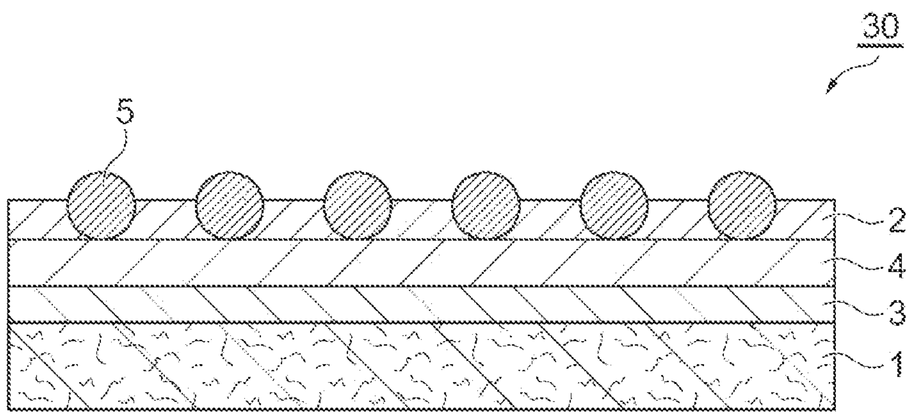
FIG. 5 is a sectional view schematically illustrating another embodiment of the laminate according to the present disclosure.

The embodiments of the present disclosure have been described in detail, but the present invention is not limited to the embodiments described above. For example, the laminate according to the present disclosure may further include layers other than the layers described above. A laminate 30 illustrated in FIG. 5 includes a vapor-deposited layer 4 between the clay coated layer 3 and the coating layer 2.

Examples of the vapor-deposited layer 4 include a metal foil, or a vapor-deposited layer of an inorganic oxide or a metal. Examples of the metal foil include an aluminum foil. Examples of the inorganic oxide include aluminum oxide, silicon oxide, magnesium oxide, tin oxide, and the like. Examples of the metal include aluminum. The vapor-deposited layer 4, for example, can be formed by a physical vapor deposition method, a chemical vapor deposition method, or the like.

The amount of water vapor permeation of the laminate 30, for example, is 5 g/m 2 day or less, and may be 2.5/m 2 day or less or 2.1 g/m 2 day or less. The amount of oxygen permeation of the laminate 20, for example, is 1 $cc/m^2$·atm·day or less, and may be 0.5 $cc/m^2$·atm·day or less or 0.2 $cc/m^2$·atm·day or less. By the laminate 30 including the vapor-deposited layer 4, the contents are protected from the deterioration due to water vapor or oxygen, and the quality is easily retained for a long period of time.

The laminate according to the present disclosure, for example, may further include a printing layer (not illustrated) on the surface of the paper substrate 1 on a side opposite to the coating layer 2. In the case of including the printing layer, it is preferable to use a printing ink not containing chlorine, from the viewpoint of preventing the printing layer from being colored or the occurrence of an odor when remelted. In addition, it is preferable to use a biomass material in a compound contained in the printing ink, from the viewpoint of environmental friendliness.

EXAMPLES

Hereinafter, the present disclosure will be described in more detail, on the basis of examples, but the present invention is not limited to the following examples.

Example 1

A laminate was produced by using the following materials.

Paper substrate: clay coated paper (basis weight: 55 $g/m^2$, thickness: 50 μm)

Coating layer: an aqueous polyolefin dispersion (CHEMIPEARL S100, manufactured by Mitsui Chemicals, Inc.)

Particles: polyethylene-based particles (CHEMIPEARL W300, manufactured by Mitsui Chemicals, Inc., average particle diameter: 3 μm)

Figure 2:
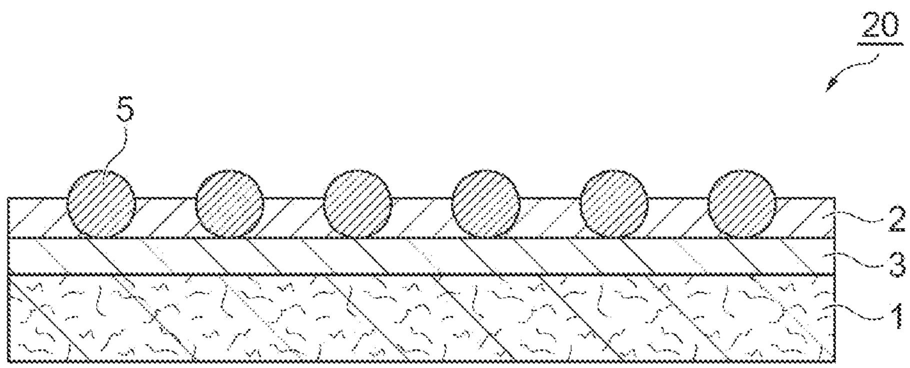
FIG. 2 is a sectional view schematically illustrating another embodiment of the laminate according to the present disclosure.

CHEMIPEARL S100 and CHEMIPEARL W300 were compounded at a solid content ratio of 100/2, and were applied onto the clay coated paper such that the thickness of CHEMIPEARL S100 after drying was 2.5 μm to obtain a laminate having a configuration illustrated in FIG. 2.

Example 2

A laminate according to Example 2 was obtained as with Example 1, except that the following material was used in the coating layer.

Coating layer: an ethylene-vinyl acetate-based dispersion (CHEMIPEARL V200, manufactured by Mitsui Chemicals, Inc.)

Example 3

A laminate according to Example 3 was obtained as with Example 1, except that CHEMIPEARL S100 and CHEMIPEARL W300 were compounded at a solid content ratio of 100/0.3, and were applied onto the clay coated paper.

Example 4

A laminate according to Example 4 was obtained as with Example 1, except that CHEMIPEARL S100 and CHEMIPEARL W300 were compounded at a solid content ratio of 100/1.5, and were applied onto the clay coated paper.

Example 5

A laminate according to Example 5 was obtained as with Example 1, except that CHEMIPEARL S100 and CHEMIPEARL W300 were compounded at a solid content ratio of 100/3.5, and were applied onto the clay coated paper.

Example 6

A laminate according to Example 6 was obtained as with Example 1, except that CHEMIPEARL S100 and CHEMIPEARL W300 were compounded at a solid content ratio of 100/7.5, and were applied onto the clay coated paper.

Example 7

A laminate according to Example 7 was obtained as with Example 1, except that CHEMIPEARL S100 and CHEMIPEARL W300 were compounded at a solid content ratio of 100/20, and were applied onto the clay coated paper.

Example 8

A laminate was produced by using the following materials.

Paper substrate: clay coated paper (basis weight: 55 g/m$^2$, thickness: 50 μm)

Anchor coating layer: an aqueous polyolefin dispersion (CHEMIPEARL S100, manufactured by Mitsui Chemicals, Inc.)

Vapor-deposited layer: aluminum (thickness: 50 nm)

Coating layer: an aqueous polyolefin dispersion (CHEMIPEARL S100, manufactured by Mitsui Chemicals, Inc.)

Particles: polyethylene-based particles (CHEMIPEARL W300, manufactured by Mitsui Chemicals, Inc., average particle diameter: 3 μm)

Comparative Example 1

A laminate according to Comparative Example 1 was obtained as with Example 1, except that the particles were not used.

Comparative Example 2

A laminate according to Comparative Example 2 was obtained as with Example 1, except that an aqueous polyolefin dispersion was applied onto the clay coated paper such that the thickness after drying was 5.0 lim.

<Production of Sample>

In a state where a load of 100 kgf was applied to a sample obtained by stacking five laminates obtained in each of the examples and the comparative examples in the same direction, the sample was contained in a constant-temperature bath set at 40° C. or 60° C. for 3 days to obtain each sample.

The sample obtained as described above was evaluated by the following method. The obtained results are shown in Table 1 and Table 2.

<Measurement of Peeling Strength>

The sample obtained from the laminate according to each of the examples and the comparative examples was cut to have a size with a width of 15 mm and a length of 100 mm to be a test piece. In the test piece, a peeling strength between the paper substrate and the coating layer was measured. The measurement was performed by a T-shaped peeling test using a tensile tester (manufactured by SHIMADZU CORPORATION), in the condition of a peeling rate of 300 mm/minute.

<Evaluation of Fiber Peeling>

The amount of paper fiber attached onto the coating layer peeled off in the measurement of the peeling strength described above was visually measured. The evaluation was performed on the basis of the following criteria.

A: The attachment of the paper fiber to the surface of the coating layer is not checked.

B: The paper fibers are slightly attached to the surface of the coating layer.

C: More paper fibers are attached to the surface of the coating layer than in B described above.

D: The torn paper substrate is attached to the surface of the coating layer.

Note that, thermal history at 60° C. for 3 days is a considerably severe condition. In a case where the evaluation of the fiber peeling after 3 days at 60° C. is "C" or "D", but the evaluation of the fiber peeling after 3 days at 40° C. is "B", it is possible to determine that the product can be sufficiently commercialized.

<Measurement of Heat-Seal Strength>

Two laminates were stacked such that the paper substrate was on the outside, were subjected to heat-seal with a heat sealer in the condition of 0.2 MPa and 120° C. for 1 second, and were subjected to a T-shaped peeling test using a tensile tester (manufactured by SHIMADZU CORPORATION), in the condition of a peeling rate of 300 mm/minute.

TABLE 1

| | | Example 1 | Example 2 | Example 3 | Example 4 | Example 5 |
|---|---|---|---|---|---|---|
| Coating layer | Materials | S100 | V200 | S100 | S100 | S100 |
| | Mass A of coating layer/mass B of particles | 100/2 | 100/2 | 100/0.3 | 100/1.5 | 100/3.5 |
| | Thickness of coating layer (μm) | 2.5 | 2.5 | 2.5 | 2.5 | 2.5 |
| Initial stage | Heat-seal strength (N/15 mm) | 3.6 | 3.6 | 3.7 | 3.6 | 3.6 |
| After 3 days at 40° C. | Visual evaluation | A | A | B | B | A |
| | Peeling strength (N/15 mm) | 0.03 | 0.02 | 0.06 | 0.07 | 0.04 |
| | Heat-seal strength (N/15 mm) | 2.6 | 2.5 | 2.9 | 3.7 | 2.9 |
| After 3 days at 60° C. | Visual evaluation | B | B | D | D | B |
| | Peeling strength (N/15 mm) | 0.07 | 0.06 | 0.32 | 0.22 | 0.06 |
| | Heat-seal strength (N/15 mm) | 3.8 | 2.9 | 2.4 | 1.2 | 2.6 |
| Water vapor permeability (g/m$^2$ · day) | | 105 | 155 | 100 | 110 | 125 |

TABLE 2

| | | Example 6 | Example 7 | Example 8 | Comparative Example 1 | Comparative Example 2 |
|---|---|---|---|---|---|---|
| Coating layer | Materials | S100 | S100 | S100 | S100 | S100 |
| | Mass A of coating layer/mass B of particles | 100/7.5 | 100/20 | 100/2 | 100/0 | 100/2 |
| | Thickness of coating layer (μm) | 2.5 | 2.5 | 2.5 | 2.5 | 5 |
| Initial stage | Heat-seal strength (N/15 mm) | 1.9 | 1.5 | 3.6 | 3.7 | 3.7 |
| After 3 days at 40° C. | Visual evaluation | A | A | A | C | C |
| | Peeling strength (N/15 mm) | 0.02 | 0.03 | 0.03 | 0.12 | 0.12 |
| | Heat-seal strength (N/15 mm) | 1.4 | 1.3 | 3.4 | 1.5 | 1.8 |
| After 3 days at 60° C. | Visual evaluation | A | A | B | D | D |
| | Peeling strength (N/15 mm) | 0.02 | 0.03 | 0.06 | 0.34 | 0.37 |
| | Heat-seal strength (N/15 mm) | 1.8 | 1.8 | 2.5 | 1.2 | 1.4 |
| Water vapor permeability ($g/m^2 \cdot day$) | | 120 | 125 | 2.1 | 105 | 80 |

REFERENCE SIGNS LIST

1: paper substrate, 2: coating layer, 3: clay coated layer, 4: vapor-deposited layer, 5: particles, 10, 20, 30: laminate, S1, S3: sample, S2: laminate.

The invention claimed is:

1. A laminate comprising:

a paper substrate;

a clay coating disposed on the paper substrate;

a coating layer containing a polyolefin resin disposed directly on the clay coating, wherein a thickness of the coating layer is 1 to 5 μm; and a plurality of particles fixed to the coating layer, wherein a material of the particles is one selected from the group consisting of polyolefin and a partially modified product thereof, wherein an average particle diameter of the particles is greater than the thickness of the coating layer, wherein the average particle diameter of the particles is 1.2 to 6.5 μm, and wherein a peeling strength is 0.1 N/15 mm or less when the peeling strength is measured through steps of:

(a1) accommodating a sample from stacking five sheets of the laminates facing a same direction in a constant-temperature bath set at 40° C. for 3 days in a state in which a load of 100 kgf is applied to the sample;

(b1) peeling off two sheets of laminates together from the sample after the step (a1); and (c1) implementing a T-type peeling test on the two sheets of laminates at a peeling rate of 300 mm/minute.

2. The laminate according to claim 1, wherein a ratio of a mass of the coating layer to a mass of the particles is 100:20 to 100:0.2.

3. The laminate according to claim 1, wherein a value from dividing the average particle diameter of the particles by the coating layer thickness is 1.05 to 2.0.

4. A roll of the laminate according to claim 1.

5. A laminate comprising:

a paper substrate;

a clay coating disposed on the paper substrate;

a coating layer containing a polyolefin resin disposed directly on the clay coating, wherein a thickness of the coating layer is 1 to 5 μm; and a plurality of particles fixed to the coating layer, wherein a material of the particles is one selected from the group consisting of polyolefin and a partially modified product thereof, wherein an average particle diameter of the particles is greater than the thickness of the coating layer, wherein the average particle diameter of the particles is 1.2 to 6.5 μm, wherein a peeling strength is 0.1 N/15 mm or less when the peeling strength is measured through steps of:

(a1) accommodating a sample from stacking five sheets of the laminates facing a same direction in a constant-temperature bath set at 40° C. for 3 days in a state in which a load of 100 kgf is applied to the sample;

(b1) peeling off two sheets of laminates together from the sample after the step (a1); and (c1) implementing a T-type peeling test on the two sheets of laminates at a peeling rate of 300 mm/minute; and wherein a heat-seal strength is 2.1 N/15 mm or more when the heat-seal strength is measured through steps of:

(a2) accommodating a sample from stacking five sheets of the laminates facing a same direction in a constant-temperature bath set at 40° C. for 3 days in a state in which a load of 100 kgf is applied to the sample;

(b2) peeling off two sheets of laminates separately from the sample after the step (a2);

(c2) heat-sealing the coating layers of the two sheets of laminates in a condition of a pressure of 0.2 MPa, a temperature of 120° C., and a time for 1 second; and (d2) implementing a T-type peeling test on a sample obtained in the step (c2) at a peeling rate of 300 mm/minute.

6. The laminate according to claim 5, wherein a ratio of a mass of the coating layer to a mass of the particles is 100:20 to 100:0.2.

7. The laminate according to claim 5, wherein a value from dividing the average particle diameter of the particles by the coating layer thickness is 1.05 to 2.0.

8. A roll of the laminate according to claim 5.

* * * * *